United States Patent [19]

Lock et al.

[11] Patent Number: 5,426,547
[45] Date of Patent: Jun. 20, 1995

[54] CASSETTE RECORDER WITH MECHANISM FOR EJECTING TAPE UPON POWER LOSS

[75] Inventors: Michael A. B. Lock, Yeovil; Derek W. J. Boles, Crewkerne; James D. LeFeuvre, Yeovil, all of England

[73] Assignee: Normalair-Garrett Holdings Limited, Yeovil, England

[21] Appl. No.: 916,371

[22] Filed: Jul. 21, 1992

[30] Foreign Application Priority Data

Jul. 27, 1991 [GB] United Kingdom ............. 9116265

[51] Int. Cl.$^6$ .................. G11B 15/00; G11B 5/008
[52] U.S. Cl. ............................... 360/96.5; 360/95
[58] Field of Search ............... 360/96.5, 95, 84, 93, 360/96.1; 242/339

[56] References Cited

U.S. PATENT DOCUMENTS

| | | | |
|---|---|---|---|
| 5,025,333 | 6/1991 | Feinberg et al. | 360/95 |
| 5,036,414 | 7/1991 | Kunze | 360/96.5 |
| 5,075,806 | 12/1991 | Nakai | 360/96.5 |
| 5,191,494 | 3/1993 | Lee | 360/96.5 |

Primary Examiner—John H. Wolff
Assistant Examiner—David L. Ometz
Attorney, Agent, or Firm—Larson & Taylor

[57] ABSTRACT

This invention provides an industrial cassette recorder including mechanisms for removing a cassette undamaged in the event of the failure of an electrical supply. The remaining mechanism automatically moves a cassette from a loading position to an unloaded position and releases a pinch roller. An electric motor is utilized as a generator to facilitate take up of slack tape.

7 Claims, 8 Drawing Sheets

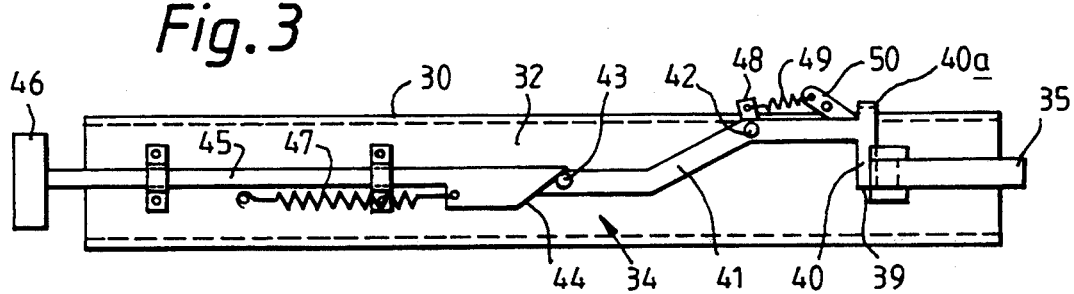
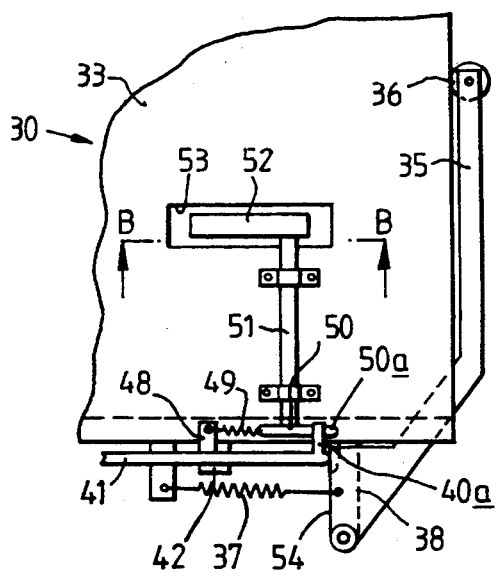
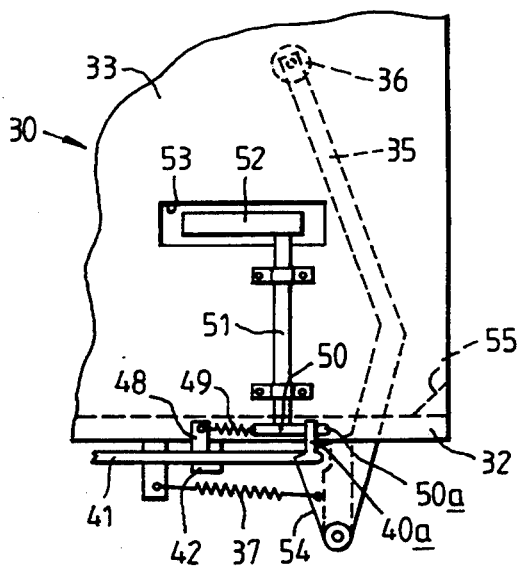

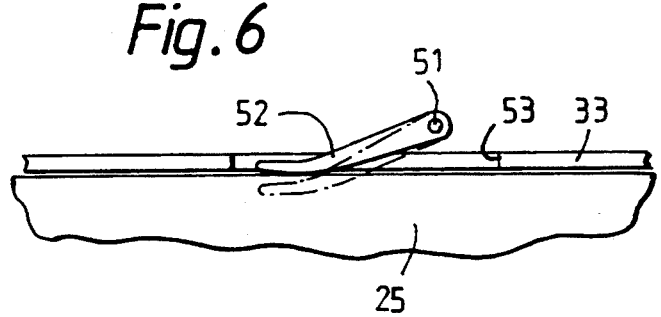
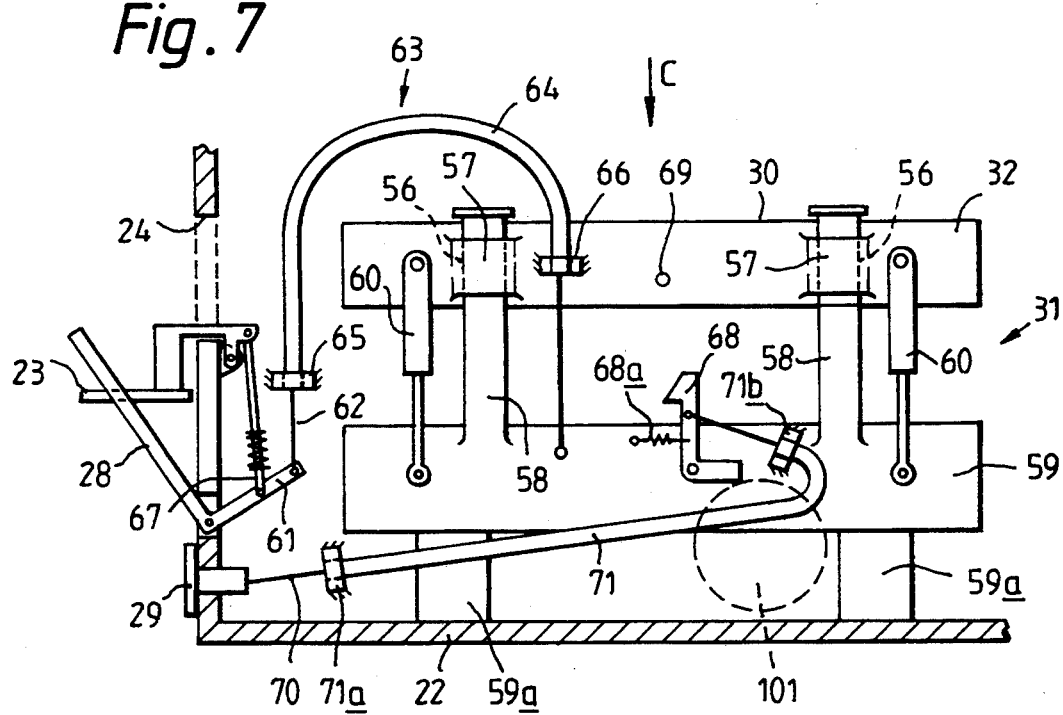

5,426,547

CASSETTE RECORDER WITH MECHANISM FOR EJECTING TAPE UPON POWER LOSS

BACKGROUND OF THE INVENTION

1. Field of the Invention

This invention relates to cassette recorders and particularly to cassette recorders which utilize a magnetic tape contained in a cassette.

2. Description of the Prior Art

Industrial cassette recorders utilize a magnetic tape contained in a cassette similar to that used in domestic systems but containing a greater length of tape and of a greater width, and is wound between a supply spool and a take-up spool. The cassette is located on a deck plate either manually if sufficient vertical space is available above the recorder or by an electrically powered elevator means adapted to accept a cassette inserted horizontally into the recorder and to move it vertically both on to and from the tape deck.

Typically, the tape deck includes electrically powered spool drive means, electrically powered means for engaging a pinch roller and electrically powered loading means for withdrawing tape from the cassette and presenting it to a recording head device.

It will be apparent therefore that in the event of a loss of power in such a cassette recorder it may not be possible to remove the cassette.

A main objective of this invention therefore is to provide a cassette recorder of the aforementioned type from which a cassette can be removed without damage to the tape in the event of a loss of power. Further objectives are to provide in the event of a loss of power; means to return the loading means to an unloaded position, means to take up slack tape caused during the return of the loading means and means to disengage the pinch roller. A yet further objective is to achieve the aforementioned objectives in a manner such that the cassette recorder reconfigures automatically to operate normally when electrical power is restored. In cassette recorders having an elevator means a yet further objective of the invention is to provide in the event of a loss of power means to operate the elevator means and lift the cassette to a position adjacent a removal aperture and ejection means for ejecting the cassette through the aperture.

SUMMARY OF THE INVENTION

Accordingly this invention provides a cassette recorder having electrically powered loading means movable between an unloaded position and a loaded position to withdraw tape from a cassette and present it in operational relationship to a recording head and includes spring means loaded automatically during movement of the loading means to the loaded position and adapted so as to return the loading means to the unloaded position in the event of a loss of electrical power.

The spring means may be operatively associated with a gear of a gear train driven by an electric motor and loaded automatically by rotation of the gear in driving the loading means to the loaded position.

Preferably the spring is a tension spring anchored at one end and attached to a cable wound around the circumference of a drum attached concentrically to said gear. Torque varying means may be provided for varying the torque applied by the tension spring during movement of the loading means to the unloaded position by the spring, and said means may comprise means for increasing the operational radius of the cable on the drum at an appropriate location around the circumference of the drum.

The cassette recorder may include a pinch roller mounted for pivotal movement between an engaged position in which it biases the tape into contact with a capstan and a disengaged position, spring means biasing the pinch roller to the disengaged position, an offset roller on an electrically rotatable disc for moving the pinch roller to the engaged position, a cable wound around the circumference of the disc and attached to the loading means whereby in the event of an electrical power failure movement of the loading means to the unloaded position acts through the cable to rotate the disc and attached offset roller and permit movement of the pinch roller to the disengaged position. The cassette recorder may include a rotatable recording head device driven by an electric motor, and electric motors for driving a supply spool and a take-up spool respectively, a changeover relay in the electrical supply to the recording head motor and held normally energised by the electrical power supply, the relay release contacts being wired so as to connect the recording head motor to the spool motors whereby in the event of a power failure the inertia of the recording head and motor assembly causes the recording head motor to generate electricity and rotate the spool motors to take up slack tape as the loading means moves to its unloaded position.

The cassette may be located in a cassette carrier on manually operable elevator means adapted to move the carrier vertically from an upper position at which the cassette is inserted into the carrier and a lower position, lock means for locking the carrier at the lower position, release means for manually releasing the lock means and spring means compressed automatically on lowering the carrier so as to return the carrier to its upper position when the lock means is released.

Preferably the cassette carrier includes location means adapted to prevent incorrect insertion of the cassette and ejection means to selectively eject the cassette from the carrier.

In another aspect the invention provides a cassette recorder having electrically powered loading means movable between an unloaded position and a loaded position to withdraw tape from a cassette and present it in operational relationship to a recording head, a pinch roller operated by an offset roller on an electrically powered rotatable disc between a disengaged position and an engaged position to pinch the tape against a capstan, means for moving the loading means to the unloaded position in the event of a loss of electrical power, a cable wound around the circumference of the pinch roller disc and attached to the loading means so that in the event of a loss of electrical power the movement of the loading means to the unloaded position acts through the cable to rotate the disc and permit movement of the pinch roller to the disengaged position.

In yet a further aspect the invention provides a cassette recorder having electrically powered loading means movable between an unloaded position and a loaded position to withdraw tape from the cassette and present it in operational relationship to a rotatable recording head means operated by an electric motor, electric motors for driving a supply spool and a take-up spool in the cassette, a changeover relay in the electrical supply to the recording head motor and whose release contacts are electrically connected to the spool motors whereby in the event of a loss of electrical power the relay drops out and electrical power generated by the recording head motor driven by the inertia of the recording head is routed directly to the spool motors to take up slack tape as the loading means moves to its unloaded position.

In yet a further aspect the invention provides a cassette recorder having a cassette carrier adapted to receive a cassette as it enters the recorder and located on manually operable elevator means adapted to move the cassette vertically from an upper position at which the cassette is inserted to a lower operational position, lock means for locking the carrier at the lower position, release means for releasing the lock means and spring means charged automatically on lowering the carrier and operable to return the carrier to its upper position when the lock means is released.

BRIEF DESCRIPTION OF THE DRAWINGS

The invention will now be described by way of example only and with reference to the accompanying drawings in which, FIG. 3 is a detail view taken on arrow A of FIG. 2 of a cassette carrier used in the invention, FIG. 4 is a fragmentary plan view of part of the cassette carrier of FIG. 3 in one operational condition, FIG. 5 is a fragmentary plan view similar to FIG. 4 and showing the cassette carrier in another operational condition, FIG. 6 is a fragmentary sectioned view taken on lines B—B of FIG. 4, FIG. 7 is a fragmentary side view taken also in the direction of arrow A of FIG. 2 and illustrating elevator means in more detail.

DETAILED DESCRIPTION OF THE DRAWINGS

Figure 1:
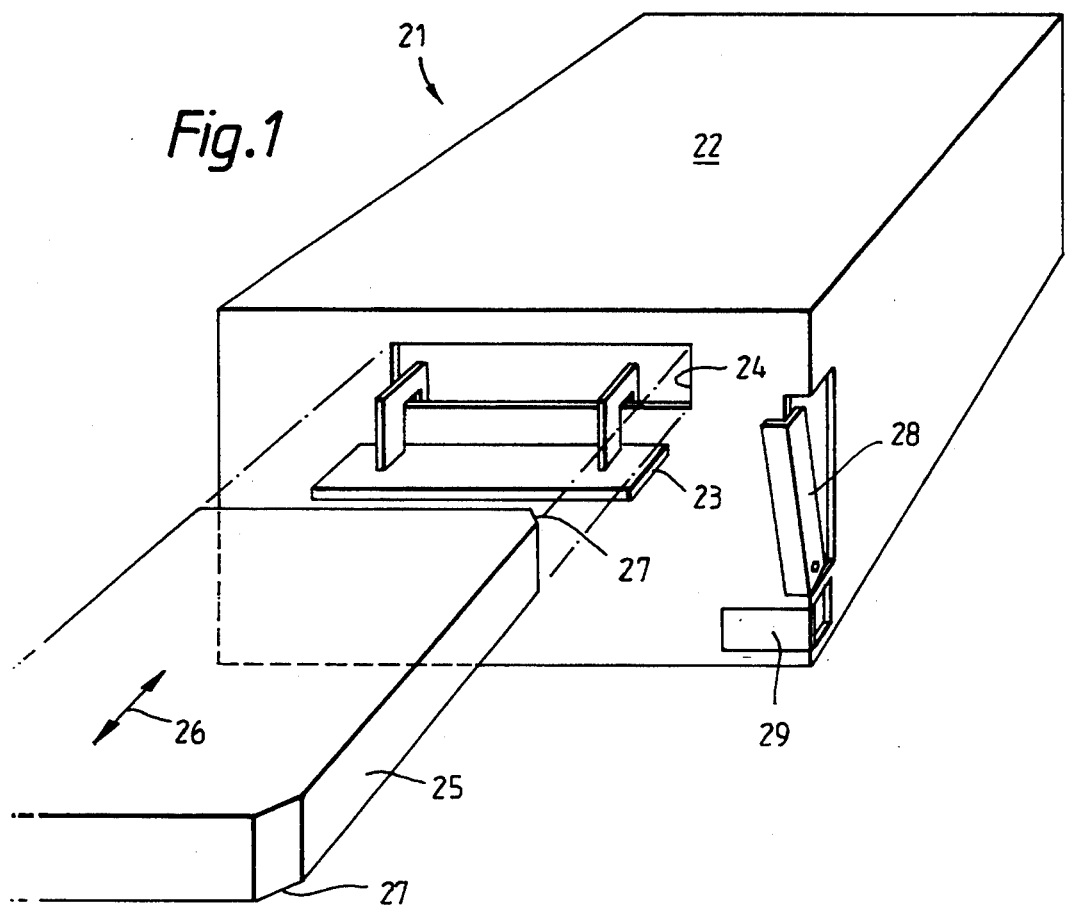
FIG. 1 is an external perspective view of a cassette recorder constructed according to this invention.

Referring now to FIG. 1, a cassette recorder generally indicated at 21 includes a generally box shaped casing 22. A door 23 pivotally mounted on one end of the casing 22 provides access to a "letter box" slot 24 through which a cassette 25 is inserted and removed as indicated by arrow 26.

The cassette 25 is of a known type having a tape supply spool and a tape take-up spool (not shown) with a magnetic recording tape wound between the spools. Access to the spools is via apertures in the lower surface of the cassette 25 (not shown) and it will be noted that cassette 25 has a planar upper surface and a chamfer 27 at both rear corners.

An operating lever 28 is pivotally mounted at an edge of the end of the casing 22 containing slot 24 and a release lever 29 is located below operating lever 28. The operating lever 28 and release lever 29 are operatively associated with an elevator means (not shown) which is fully described and illustrated hereinafter.

Figure 2:
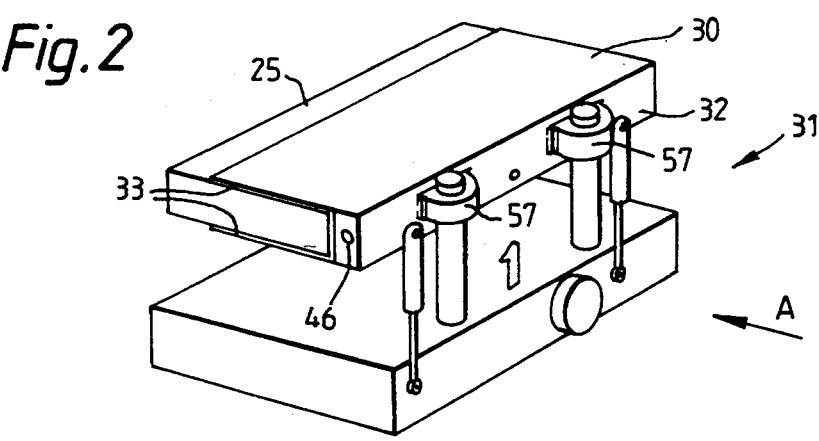
FIG. 2 is a somewhat schematic perspective of a part of the cassette recorder.

FIG. 2 is a schematic perspective of part of the cassette recorder 21 with the case 22 removed. On insertion of the cassette 25 through slot 24 (FIG. 1) the cassette is entered into a cassette carrier 30 forming part of a cassette elevator means 31 to be described more fully hereinafter.

Cassette carrier 30 comprises a spine portion 32 and two spaced apart plates 33 straddling the cassette 25. Location means generally indicated at 34 (FIG. 3) and mounted in the spine 32 ensures that the cassette 25 is only accepted by the carrier 30 when it is correctly oriented, and includes manually operable release means.

Referring now to FIGS. 3 to 6 inclusive, location means 34 includes an eject lever 35 pivotally mounted at one end of the carrier 30 and carrying a roller 36 at an inner end for engagement by an end face of cassette 25. Eject lever 35 is shown in a cassette loaded position in FIG. 4 and is loaded by spring means 37 towards a cassette eject position shown in dotted line in FIG. 5. Eject lever 35 includes an inwardly extending contact surface 38 which, in the unloaded condition (FIG. 5) is abutted by the end 39 of a spigot 40 (FIG. 3) formed at one end of a lever 41 pivotally mounted at 42 to the spine 32.

The other end of lever 41 carries a pin 43 engaged by a tapered end 44 of a release lever 45 slidably mounted on spine 32 and carrying an external release button 46 at its other end. Release lever 45 is biassed by spring 47.

A boss 48 located adjacent the pivot 42 on lever 41 provides an attachment for one end of a tension spring 49 the other end being attached to a lever 50 fixed to one end of a shaft 51 rotationally mounted on upper plate 33 of carrier 30. The other end of shaft 51 id fixed to one end of a contact shoe 52 located in an aperture 53 and which is pivotable between a position shown in full line in FIG. 6 when cassette 25 is loaded and a position shown in broken line when cassette 25 is not loaded. An extension 40a extends inwardly from the end of lever 41 above the spigot 40 to cover an end 50a of lever 50.

Operation of the location means 34 will first be described assuming that cassette 25 is correctly oriented, namely with the planar surface uppermost and a chamfered edge 27 located at the leading rear corner (see FIG. 1). Insertion of the cassette 25 first moves contact shoe 52 upwardly which operates through shaft 51 to increase the tension of spring 49. Cassette 25 then contacts roller 36 to move eject lever 35 from the position shown in broken line in FIG. 5 to the loaded position shown in FIG. 4 in which position an edge region 54 of surface 38 clears the end of spigot 40 which causes lever 41 to pivot under the influence of tensioned spring 49 to the position shown in FIGS. 3 and 4 in which the edges of spigot 40 and surface 38 abut to retain eject lever 35 in the loaded position.

Ejection of the cassette 25 is achieved by pressing button 46 which causes sliding surface 44 to react on pin 43 and pivot lever 41 to lift spigot 40 out of engagement with edge 54 of surface 38 whereby the cassette 25 is pushed from carrier 30 by eject lever 35 under the influence of the spring 37.

If cassette 25 is incorrectly oriented the location means 34 prevents acceptance by the carrier 30 in the following manner. If it is attempted to load the cassette 25 with a sharp edge at the leading rear corner and either the planar or apertured surface uppermost, an angled barrier 55 (FIG. 5) provided on the carrier 30 prevents the cassette 25 being inserted far enough to pivot eject lever 35 to the position at which spigot 40 moves into engagement with edge 54 of surface 38. On the other hand if it is attempted to load the cassette 25 with the apertured surface uppermost and a chamfered corner at the rear of the leading edge the contact shoe locates in the aperture and therefore remains in the broken line position shown in FIG. 5 so that extension 40a contacts the raised end 50a of lever 50 and is therefore prevented from dropping into engagement with edge 54.

The elevator means 31 will now be described with reference to FIGS. 2 and 7. The elevator means 31 comprises two bearings 56 located in bosses 57 formed on the spine 32 of cassette carrier 30 for sliding engagement on circular shafts 58 extending vertically from a deck plate 59 mounted inside casing 22 on anti-vibration mounts 59a. The carrier 30 is biassed towards its upper illustrated position by spring means comprising two gas spring devices 60 attached between the carrier 30 and the deck plate 59 adjacent the shafts 58.

An inner end of an extension 61 of operating lever 28 (see also FIG. 1) is attached to one end of the wire 62 of a flexible sheathed wire cable (Bowden cable) generally indicated at 63, the other end of the wire 62 being attached to the deck plate 59. The ends of the cable sheath 64 are attached respectively to the case 22 adjacent the end of extension 61 as indicated at 65 and to the cassette carrier 30 as indicated at 66.

Pivoted door 23 (see also FIG. 1) is attached to the extension 61 of lever 28 by a spring loaded rod 67.

An L-shaped latch 68 is pivotally attached to the deck plate 59 and is biased to a latching position by a spring 68a for engagment during a certain phase of operation with a pin 69 protruding from the spine 32 of cassette carrier 30. The wire 70 of a flexible sheathed wire cable (Bowden cable) is attached between latch 68 and the release lever 29 (see also FIG. 1) and the ends of the cable sheath 71 are attached respectively to the case 22 as indicated at 71a and to the deck plate 59 as indicated at 71b.

The elevator 31 is shown with the cassette carrier 30 aligned with slot 24 in a position permitting insertion of a cassette 25. Once the cassette 25 has been inserted correctly as hereinbefore described, operation of the operating lever 28 by pushing it to a position flush with case 22 pushes the cassette carrier 30 and loaded cassette 25 down into an operational position on deck plate 59. Once in that position latch 68 engages pin 69 to securely retain the carrier 30. It will be noted that door 23 is automatically moved closed through spring loaded rod 67 as the lever 28 is moved to lower the carrier 30 which action also has the effect of charging the gas spring devices 60.

To raise elevator means 31 the release lever 29 is pulled to pivot latch 68 out of engagement with pin 69 to permit the carrier 30 to slide upwardly on guide shafts 58 under the force exerted by the gas spring devices 60. The gas spring devices 60 provide automatic damping at the end of the upward movement of carrier 30 to prevent undesirable shock loads adversely affecting the mechanism.

It should be noted that latch 68 is operatively associated with a final drive gear 101 (shown in broken outline in FIG. 7 and hereinafter described in more detail), to ensure that release of latch 68 is possible only when the cassette recorder is in a certain operational condition.

Raising the cassette carrier 30 acts through sheathed cable 63 to pivot the lever 28 outwardly and further through the rod 67 to automatically open the door 23 to permit removal of cassette 25 from carrier 30 through the slot 24.

Figure 8:
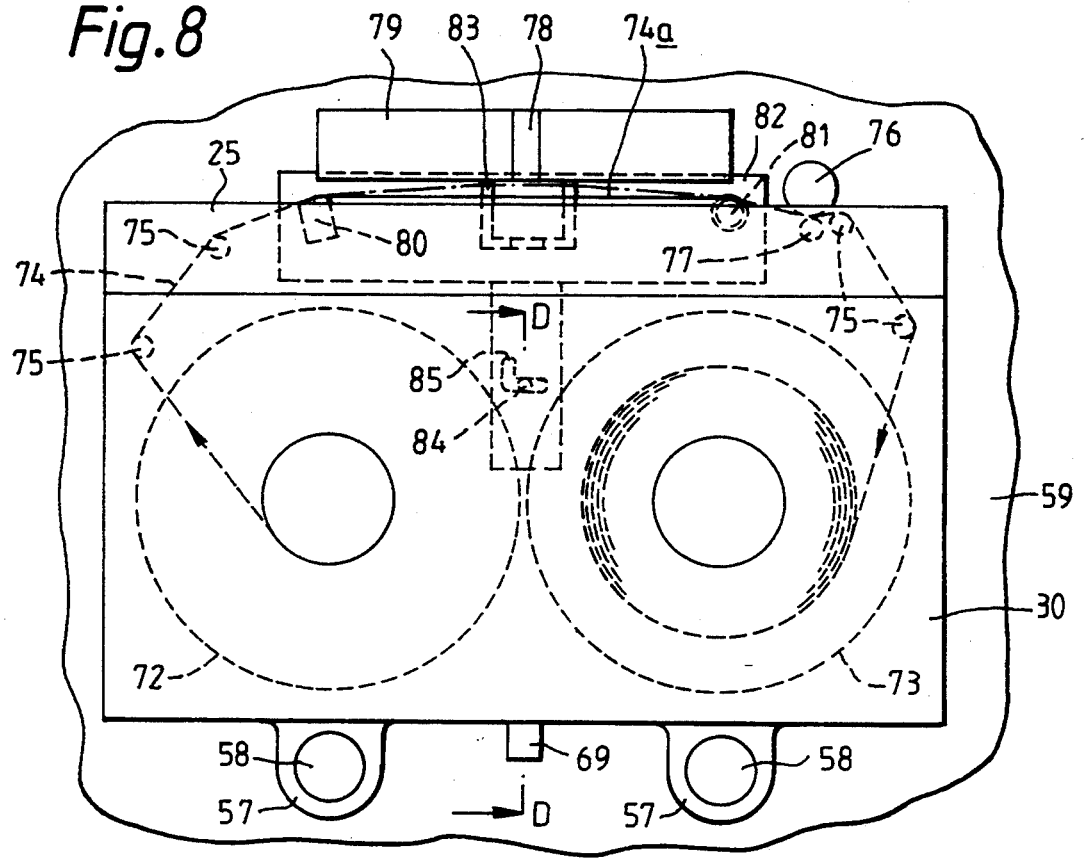
FIG. 8 is a plan view taken on arrow C of FIG. 7.

FIG. 8 is a plan view of the carrier 30 with cassette 25 located by elevator means 31 on the deck plate 59. It is to be understood that deck plate 59 includes unillustrated features such as spool drive spindles, motors, tape guide rollers and tensioning devices which are known in the art but form no part of the present invention. The drawing shows in broken outline a supply spool 72, a take-up spool 73 and a tape 74 located in the cassette 25 and routed along a path defined by four rollers 75 which are provided in the cassette 25.

A pinch roller 76 located on the deck plate 59 and described in more detail hereinafter biases, in certain phases of operation, the tape 74 into contact with a capstan 77 also located on the deck plate 59.

The cassette recorder of the illustrated embodiment uses a rotating head drum comprising a transverse scanner 78 which writes data across the width of the tape 74, and is driven by a concentrically located motor 79. To this end the tape 74 is located across spaced apart guide means 80 and 81 when the carrier 30 is moved on to the deck plate 59. Guide means 80 and 81 are carried on loading means comprising a sliding load plate 82 which moves from an unloaded position upon engagement by the cassette 25 to a loaded position illustrated in FIG. 8 in which a portion of the tape 74a is withdrawn from the cassette 25 towards the rotary head scanner 78.

Figure 9:
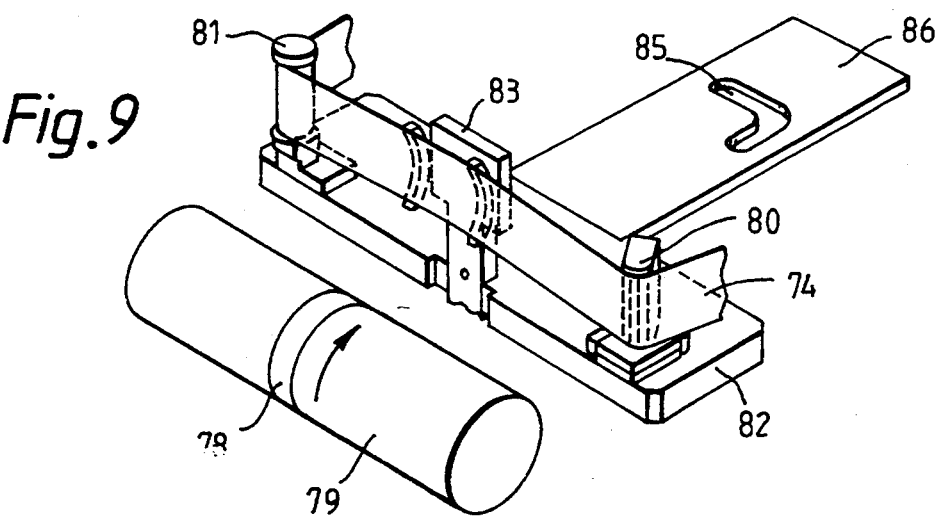
FIG. 9 is a perspective view showing part of FIG. 8 in more detail.

A solenoid operated "canoe" guide 83 is located centrally on the load plate 82 and when "record" mode is commanded operates to shape the tape 74 and to wrap it across the surface of the rotary head scanner 78 as illustrated more clearly in FIG. 9.

Load plate 82 is normally driven electrically to both its loaded and unloaded positions by an offset pin 84 operating in a J-slot 85 through a rearwardly extending arm 86 attached to the rear of load plate 82.

Figure 10:
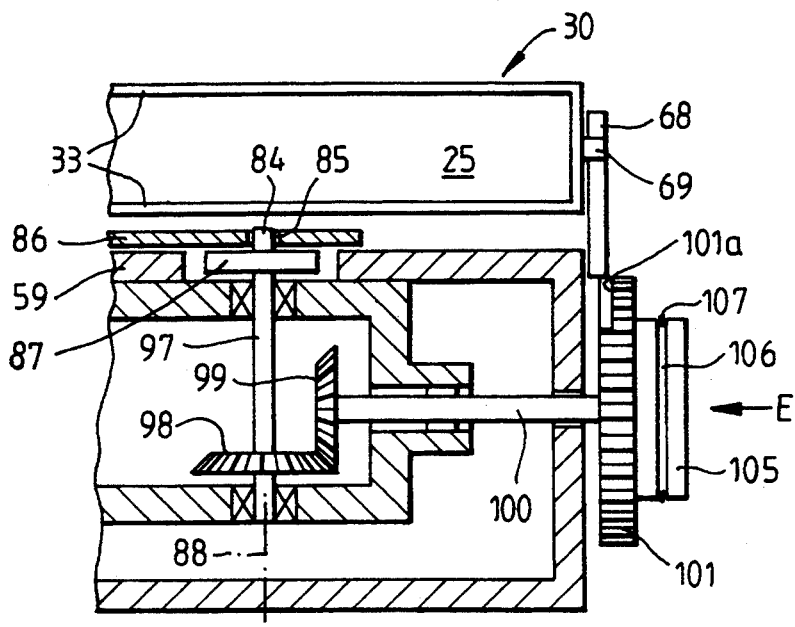
FIG. 10 is a fragmentary sectioned view taken on lines D—D of FIG. 8, FIGS. 11 and 12 are fragmentary views of part of the device illustrated in FIGS. 8, 9 and 10 to show operational features.
Figure 11:
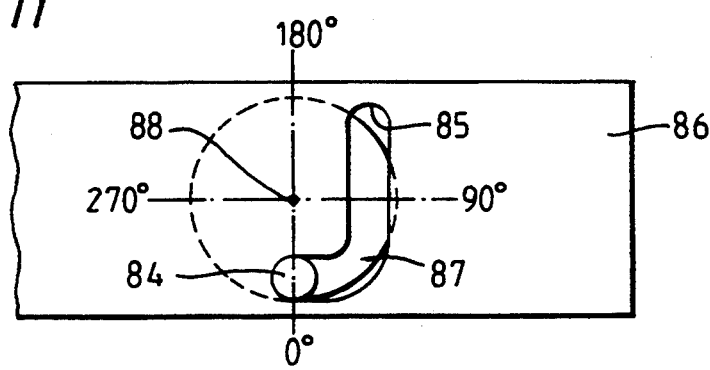
Figure 12:
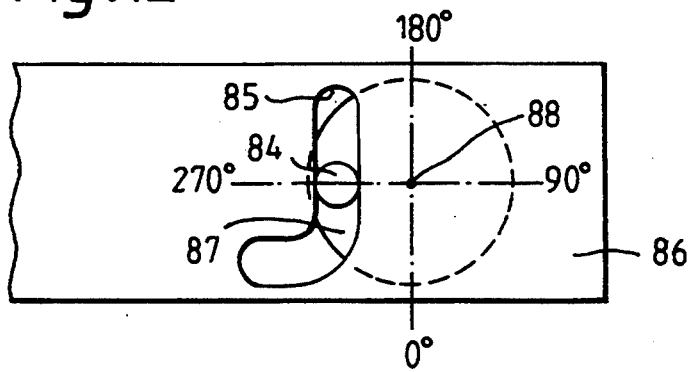

FIGS. 11 and 12 illustrate the manner of operating the sliding load plate 82. Thus, pin 84 is offset from the centre of a rotatable plate 87 located on the deck plate 59 (see also FIG. 10) for rotation about an axis 88 by an electric motor (not shown). Initial counterclockwise rotation of the plate 87 and pin 84 through 90° from the unloaded position of FIG. 11 causes no lateral movement, of plate 86 and attached load plate 82 but serves to position other devices which do not form part of this invention. Rotation through a further 180° between 90° and 270° to the loaded position drives the arm 86 and attached load plate 82 to the left in FIG. 12 to the fully loaded position as illustrated in FIG. 8. Clockwise rotation of the rotatable plate 87 through 270° from the loaded position to the position shown in FIG. 11 serves to withdraw the load plate 82 to its unloaded position.

The details of the construction and operation of the load plate 82 thus far described are part of the state of the art and form no part of the present invention.

Figure 13:
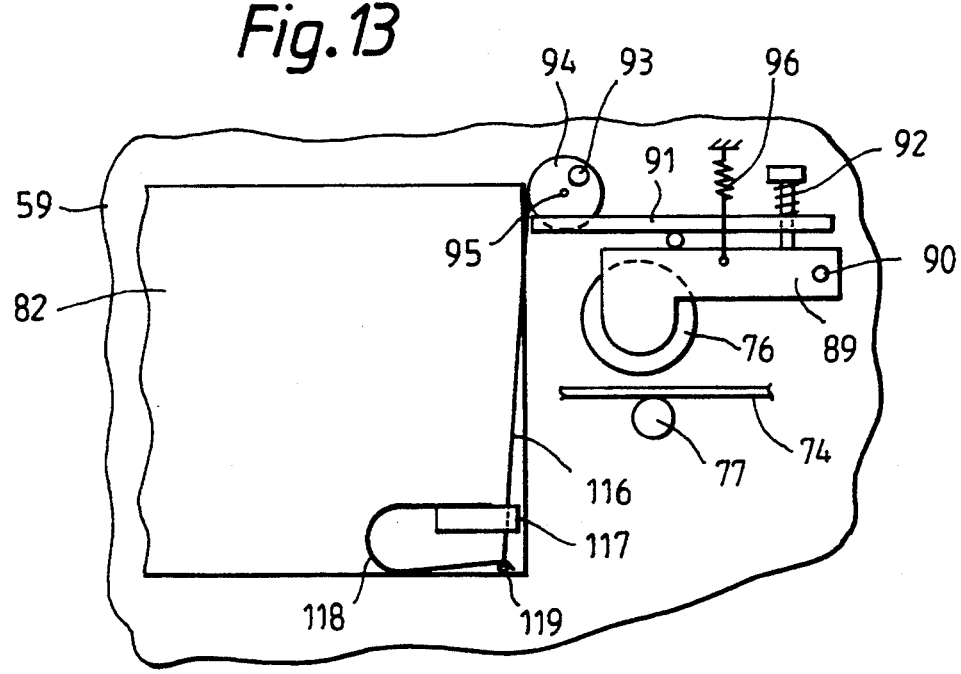
FIGS. 13 and 14 are fragmentary plan views of part of the device of FIG. 8 showing different operating conditions.
Figure 14:
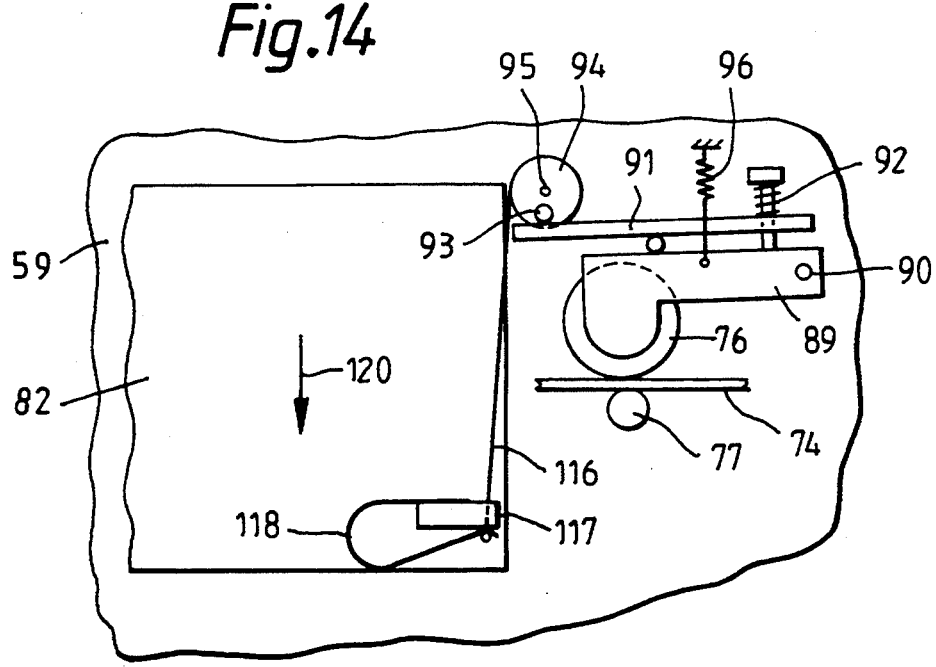

Referring now to FIGS. 13 and 14, the pinch roller 76 (see also FIG. 8) is rotationally attached at one end of a carrier arm 89 having its other end pivotally attached to deck plate 59 at 90. An arm 91 located parallel to the carrier arm 89 and attached by spring tensioning means 92 is operatively associated with an offset roller 93 carried on a disc 94 rotatable abut an axis 95 by an electric motor (not shown) operating through a clutch device (not shown). A return spring 96 is attached between the carrier 89 and deck plate 59. In operation, rotation of the disc 94 abut axis 95 in a clockwise direction through an arc of abut 120° brings roller 93 into contact with the arm 91 to pivot the carrier 89 against the spring 96 about pivot 90 to move the pinch roller 76 into contact with the surface of tape 74 in order to pinch the tape 74 between it and the capstan 77 (see also FIG. 8) as illustrated in FIG. 14.

Normally, withdrawal of the pinch roller 76 to the disengaged position of FIG. 13 is accomplished by counterclockwise rotation of disc 94 by the electric motor to disengage the roller 93 permitting the carrier 89 and pinch roller 76 to return to the disengaged position under the influence of the spring 96.

The details of the construction and operation of the pinch roller 76 thus far described are part of the state of the art and form no part of the present invention.

It will be clear from the above description that in the event of a loss of power to the prior art cassette recorder the load plate 82 cannot be reverse driven from the loaded position, and the pinch roller 76 cannot be moved to the disengaged position. Consequently, in the event of a loss of power it is not possible to remove the cassette 25 which may be a requirement in some installations.

Therefore, a major objective of this invention is to provide a cassette recorder of the above described type in which it is possible to remove the cassette 25 in the event of a loss of power without damage to the tape. More specifically, an objective is to provide means to move the load plate 82 to its unloaded position and to move the pinch roller 76 to its disengaged position in the event of a loss of power and in such a manner that normal operation is possible when power is restored. In achieving movement of the load plate 82 to the unloaded position another objective is to take up the slack tape resulting from such movement since the electrically operative spool drive motors also would not be functioning as normal.

The following description is concerned with the manner of achieving these objectives.

Figure 15:
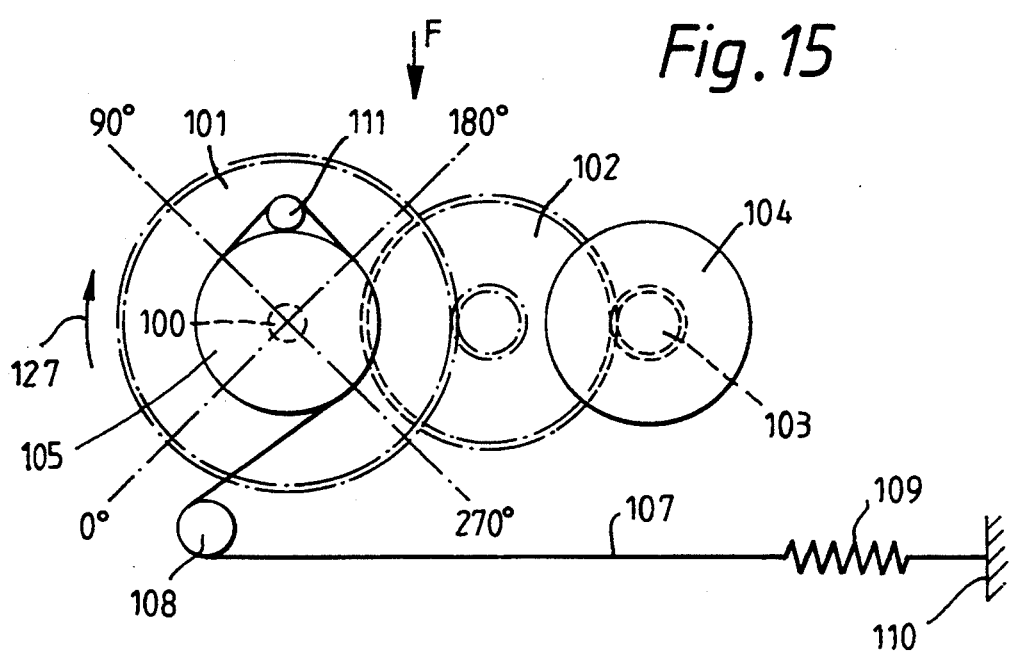
FIG. 15 is a view taken on arrow E of FIG. 10.
Figure 16:
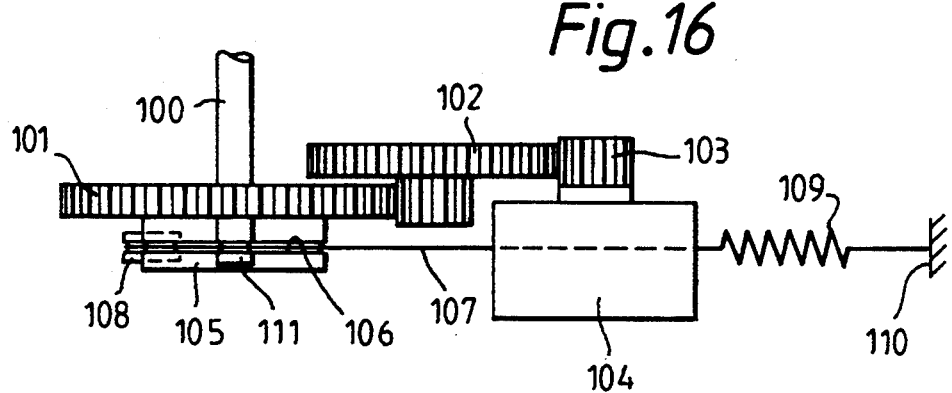
FIG. 16 is a plan view taken on arrow F of FIG. 15.

Reverting now to FIG. 10, the rotatable plate 87 carrying the offset pin 84 is attached to a shaft 97 mounted for rotation abut the axis 88 and carrying a bevel gear 98 meshed with a bevel gear 99 attached to a horizontal shaft 100 extending inwardly from a final drive gear 101. As shown in FIGS. 15 and 16, final drive gear 101 completes a reduction gear train comprising an intermediate gear 102 and a drive gear 103 connected to an electric motor 104, all located externally of the deck plate 59.

Final drive gear 101 carries a concentric drum 105 having a circumferential groove 106 and anchor means (not shown) for anchoring one end of a cable 107 which is wound around the drum 105 in the groove 106. Cable 107 is routed around a pulley 108 is connected to an extension spring 109 anchored to deck plate 59 as illustrated schematically at 110 in FIGS. 15 and 16.

At a particular location around the circumference of the drum 105 the cable 107 is routed over a peg 111 to increase locally the operational radius and for a purpose to be more fully described hereinafter.

It should be noted that FIG. 15 illustrates the components in a position corresponding to that with the load plate 82 (FIG. 8) in its loaded position and with pin 84 in the position illustrated in FIG. 12, this position having been reached by counterclockwise rotation of the final drive gear 101 which has wound cable 107 around the drum 105 to fully extend the spring 109.

Conceptually, then, this invention is concerned to tension spring 109 automatically during electrically powered movement of load plate 82 to its loaded position and to apply a holding current to hold both the load plate 82 in the loaded position and the spring 109 in tension. In the event that electrical power is lost, the holding current drops to zero and the energy in spring 109 backdrives the system by rotating final drive gear 101 in a clockwise direction as indicated by arrow 127 in FIG. 15 thereby rotating pin 84 back to the position shown in FIG. 11 to withdraw the load plate 82 to its unloaded position. In implementing the invention, 0however, many inter-related and dependent practicalities had to be addressed.

Thus, within the necessary constraints of size and available power it is beneficial to provide a motor 104 having a high torque output in a small package and in the particular embodiment described and illustrated the best advantage in respect of torque/volume characteristics was achieved by incorporation off a reduction gear train 101, 102, 103. Even so it is to be remembered that the motor 104 has to be back driven by the spring 109 during unloading of the load plate 82, dictating that the gear ratio must be kept as low as possible to maintain a relatively high back drive efficiency.

In considering the characteristics of the motor 104 therefore it was necessary to establish the torque required to drive the load plate 82 to its loaded position and to take account that the motor 104 must also tension the spring 109 during the load cycle.

Figure 17:
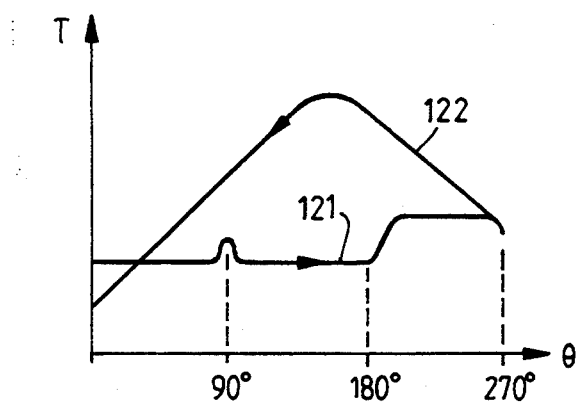
FIG. 17 is a graph showing torque loading effective in different phases of operation.

The torque characteristics measured during the powered load and unload cycles for a particular cassette recorder are illustrated in FIG. 17 which plots torque T against rotational angle $\Theta$ of pin 84. The figure shows that the torque 121 during the load cycle is reasonably constant over the 270° of cam operation but the torque 122 during the unload cycle showed a high peak in moving between 180° and 90° i.e. at mid-travel, which was due to the load required to operate other features including release of spool hub clamps.

Figure 18:
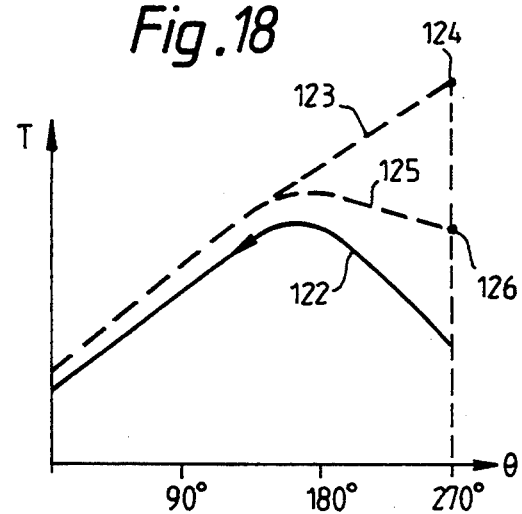
FIG. 18 is a graph similar to FIG. 17 illustrating an operational feature of the invention.

From FIG. 17 it will be clear that spring 109 (FIG. 15) must have a torque characteristic capable of matching the peak during unload whilst the load torque (generated by the motor 104) will be the sum of the load torque 122 and that required to tension the spring 109. A spring generally has a linear load characteristic and in order to cope with the peak during the unload cycle such a spring used as spring 109 without other expedients would need to have the characteristic indicated by the straight broken line 123 in FIG. 18, resulting in a very high torque load being applied by the spring 109 at the loaded position of the load plate 82, i.e. the 270° cam position, as illustrated at point 124. Bearing in mind that the load plate 82 is held in the loaded position during normal operation by a holding current applied to the motor 104 and that such a current is proportional to the torque it is holding, such a high holding torque load is undesirable since it could result in overheating of the motor 104.

The inventors investigated means for varying the torque applied by the spring 109 to match it more closely to the require, unload torque in order to enable use of a spring giving a lower maximum (holding) torque when fully loaded. This was achieved in the illustrated embodiment of the invention by incorporation of the peg 111 on the drum 105 in that segment of its operating arc corresponding to the peak in the unload torque 122. Thus the peg 111 increases the radius of operation (and therefore the applied torque) through that particular segment of the arc of operation which corresponds to the peak torque load during unload. This means that the unload torque produced by the spring 109 and shown by broken line 125 in FIG. 18 more closely matches the required unload torque 122 and yet has a reduced maximum torque at the 270° cam position as illustrated at point 126 in FIG. 18, thereby reducing the current required during normal operation to hold the load plate 82 in its loaded position.

The motor 104 and load plate assembly have substantial inertia that needs to be dissipated at the unloaded position of the load plate 82 when driven to the unloaded position by the spring 109. To solve this problem, a microswitch (not shown) is attached to the deck plate 59 and is actuated to operate over the initial rotation of the pin 84 (from 0° to 90°). The switch operates to apply a resistive load across the motor 104 with a series diode which opposes current flow when the motor 104 is energised normally to move the load plate 82 to the loaded position. During the unload movement under the influence of the spring 109 the microswitch operates when the 90° position is reached to allow reverse current to flow in the resistive load by virtue of the back emf of the load motor. This dynamically brakes the motor 104 to rest at the unloaded position of the load plate 82.

Another important requirement in any unpowered movement of the load plate 82 to its unloaded position is to provide means for winding slack tape back into the cassette as the load plate 82 is withdrawn to its unloaded position, since the normal spool drive motors (not shown) would also be rendered non-operational in that event.

In considering this problem the inventors noted that the drive motor 79 rotated the rotating head scanner 78 (FIGS. 8 and 9) at a normal operating speed of 30,000 rpm and realised, therefore, that the assembly had significant kinetic energy. They reasoned that by operating the motor 79 as a generator in the event of a loss of power, this energy might be sufficient to provide a source of usable electrical power. Tests showed that electrical power could be generated in this way and that it was adequate to operate the spool motors for a period of about five seconds and could therefore be utilized to take up the slack tape provided that the aforementioned spring powered unload of the load plate could also be implemented within that duration.

Analysis and prototype testing indicated that the spring unload system would backdrive the motor 104 (FIGS. 15 and 16) and move load plate 82 to its unloaded position within three seconds.

Figure 19:
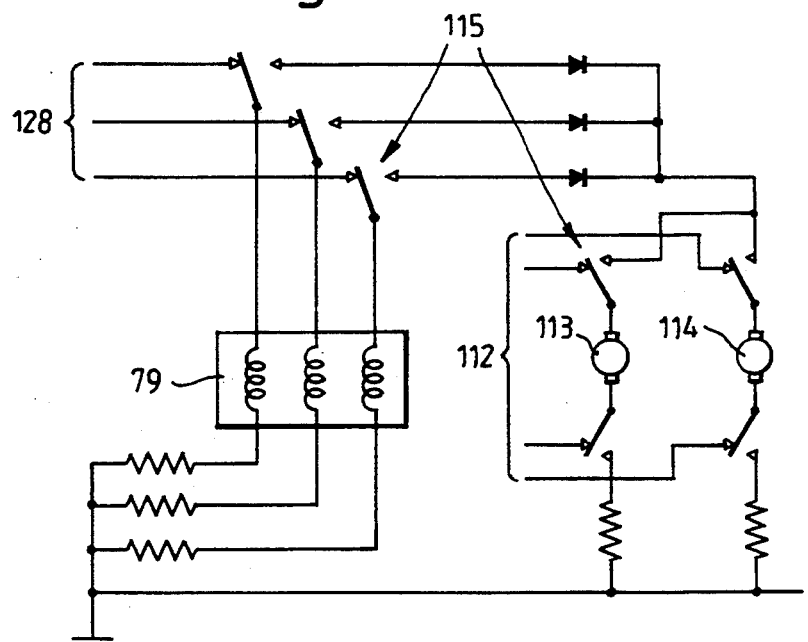
FIG. 19 is a wiring diagram.

The manner in which tape take-up is achieved will now be described with reference to the wiring diagram of FIG. 19. The three phase electrical supply 128 to the scanner drive motor 79 and the electrical supply 112 from the servos to each of the spool drive motors 113 and 114 operatively associated respectively with the supply spool 72 and take up spool 73 (FIG. 8) is wired through a changeover relay 115 which as illustrated is held energized by the power supply. In the event of a loss of power, relay 115 drops out and its release contacts are connected so as to route the available electrical output from the scanner motor 79, now acting as a generator, directly to the spool drive motors 113 and 114 to operate the motors for sufficient time to take up the slack tape 74 as the load plate 82 is withdrawn to its unloaded position. In order to generate sufficient electrical power for efficient operation it is necessary that the scanner 78 as reached its full operating speed before the load plate 82 is moved to its loaded position.

An additional useful feature of this arrangement is that the electrical current generated by the motor 79 provides active braking of the spool motors 113 and 114 in the event that electrical power fails whilst the tape 74 is in motion.

The remaining problem faced by the inventors was that of moving the pinch roller 76 from the engaged position (FIG. 14) to the disengaged position (FIG. 13) in the event of a loss of power which, as hereinbefore explained, is also necessary in order to be able to remove the cassette 25 in that event and without damaging the tape.

Reverting then to FIG. 13 in which the load plate 82 is shown in its loaded position and pinch roller 76 is disengaged. A cable 116 is attached to and wrapped around the circumference of the disc 94 and is routed through a block 117 attached to the surface of the load plate 82. The cable 116 passes through the free end of a leaf spring 118 and is retained in position by an end piece 119. In rotating the disc 94 to move the pinch roller 76 to its engaged position shown in FIG. 14 more of the cable is wound round disc 94 and the free end of spring 118 is pulled into contact with an adjacent surface of block 117. It should be noted that engagement of the pinch roller 76 is possible only when the load plate 82 is in its loaded position.

In the event of a loss of power and the subsequent movement of the load plate 82 under the influence of spring 109 in the direction of arrow 120 as hereinbefore described, the block 117 causes a pulling force on cable 116 which rotates disc 94 counter-clockwise by slipping of the clutch (not shown) back to the position of FIG. 13 to allow the pinch roller 76 to be moved to the disengaged position under the influence of the return spring 96.

Figure 20:
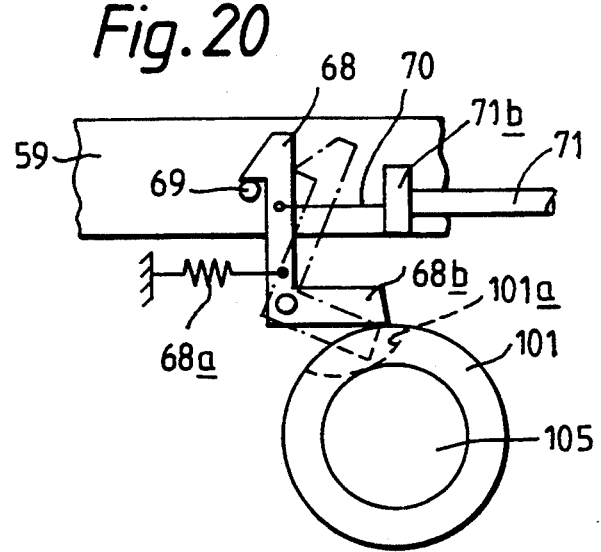
FIG. 20 is a fragmentary view of part of FIG. 7 on an enlarged scale.

It has previously been noted that inhibit means are provided to prevent operation of the latch 68 (FIGS. 7 and 10) until the load plate 82 is withdrawn to the unloaded position. As shown in particular in FIGS. 10 and 20 this is achieved by the leg 68*b* of the L-shape latch 68 being prevented by an external surface of the final drive gear 101 from pivoting to the unlatched position shown in broken line in FIG. 20 until a cut-out 101*a* in the circumference of the final drive gear 101 moves to the enabling position of FIG. 20 when load plate 82 is fully withdrawn to its unloaded position.

Thus, in operation of the cassette recorder of this embodiment of the invention, in the event of a loss of electrical power, the load plate 82 is automatically moved to its unloaded position, the slack tape 74 is taken up by the spool motors and the pinch roller 76 is moved to the disengaged position all as hereinbefore described. Once the load plate 82 is in its unloaded position the release lever 29 (FIG. 7) may be pulled to release latch 68 to permit the elevator means 31 to raise the cassette carrier 30 under the influence of the gas springs 60 to a position aligned with the slot 24 in case 22. A push on release knob 46 (FIGS. 2 and 3) releases the mechanism 34 and the cassette 25 is pushed out of the carrier 30 by eject lever 35 to protrude through the slot 24 of the case 22 for removal by hand.

The manual loading and unloading of the cassette 25 relative the deck plate 59 is important for two reasons. Firstly, it clearly facilitates removal of the cassette 25 in the event of an electrical power failure and, secondly, by locating the cassette 25 on to the deck plate 59 immediately it is loaded ensures that it is protected from damage by vibration during phases of operation that recording is not taking place.

Whilst one embodiment has been described and illustrated it will be understood that many modifications may be made without departing from the scope of the invention. For example, the described cassette carrier 30 and elevator means 31 may be replaced by any suitable means for locating the cassette in its operative position on the deck plate 59 and may be dispensed with altogether in cassette recorders in which space is available to enable manual location of the cassette 25 on the deck plate 59. The gas spring devices 60 can be replaced by conventional coil compression springs located on sliding central support pillars and, in such an embodiment, the desirable damping at the end of upward movement of the carrier could be achieved by any suitable damping means such as a piston located at the top of the shafts 58 for location, towards the end of movement, in a cylinder extended upwardly from the bosses 57.

What is claimed is:

1. A cassette recorder (21) including electrically powered loading means (82, 84, 85) movable between an unloaded position and a loaded position to withdraw tape (74) from a cassette (25) and present it in operational relationship to a recording head (78), comprises a tension spring (109) anchored at one end (110) and attached to a cable (107) wound around the circumference of a drum (105) attached concentrically to a gear (101) of a gear train (101, 102, 103) driven by an electric motor (104) so that the spring is loaded automatically by rotation of the gear (101) by the electric motor during movement of the loading means from the unloaded to the loaded position, whereby in the event of a loss of electrical power to the motor the loading means is returned automatically to the unloaded position by the spring.

2. A cassette recorder as claimed in claim 1 wherein torque varying means (111) are provided for varying torque applied by the tension spring (109) during movement of the loading means to the unloaded position by said spring.

3. A cassette recorder as claimed in claim 2 wherein said torque varying means comprise means (111) for increasing the operational radius of the cable (107) on the drum (105) at an appropriate location around the circumference of the drum.

4. A cassette recorder as claimed in claim 1 and including a pinch roller (76) mounted for pivotal movement between an engaged position in which it biases the tape (74) into contact with a capstan (77) and a disengaged position, spring means (96) biasing the pinch roller to the disengaged position, an offset roller (93) on an electrically rotatable disc (94) for moving the pinch roller to the engaged position and a cable wound around a circumference of the disc and attached to said loading means (82) whereby in the event of an electrical power failure movement of the loading means (82) to the unloaded position acts through the cable (116) to rotate the disc (94) and attached offset roller (93) and thereby permits movement of the pinch roller (76) to the disengaged position.

5. A cassette recorder (21) having electrically powered loading means (82, 84, 85) movable between an unloaded position and a loaded position to withdraw tape (74) from a cassette (25) and present it in operational relationship to a recording head (78), and a pinch roller (76) operated by an offset roller (93) on an electrically powered rotatable disc (94) between a disengaged position and an engaged position to pinch the tape against a capstan (77), includes means (109, 107, 105) for moving the loading means to the unloaded position in the event of a loss of electrical power, a cable (116) wound around the circumference of said pinch roller disc (94) and attached to the loading means (82) so that in the event of a loss of electrical power the movement of the loading means to the unloaded position acts through said cable (116) to rotate said disc (94) and permit movement of the pinch roller to the disengaged position.

6. A cassette recorder (21) including loading means (82, 84, 85) operable between an unloaded position and a loaded position by a gear (101) driven by an electric motor (104) to withdraw tape (24) from a cassette (25) and present it in operational relationship to a recording head, a tension spring (109) anchored at one end and with its other end attached to a cable (107) wound around the circumference of a drum (105) rotatably attached to said gear (101) so that the spring is tensioned automatically during rotation of the gear in one direction to move the loading means to the loaded position, and applying a holding current to the electric motor to retain the loading means in the loaded position, whereby in the event of a loss of electrical power the holding current drops to zero and the energy in the spring (109) rotates the gear in an opposite direction to automatically return the loading means to the unloaded position.

7. A cassette recorder (21) includes loading means (82, 84 85) operable between an unloaded position and a loaded position by a gear (101) driven by a first electric motor (104) to withdraw tape (24) from a cassette (25) and present it in operational relationship to a rotatable recording head (78) driven by a second electric motor (79), third and fourth electric motors (113, 114) for driving respectively a supply spool (72) and a take up spool (73) in said cassette, a tension spring (109) anchored at one end and with its other end attached to a cable (107) wound around the circumference of a drum (105) rotatably attached to said gear (101) so that the spring is tensioned automatically during rotation of the gear in one direction to move the loading means to the loaded position, and applying a holding current to said first electric motor (104) to retain the loading means in the loaded position, a changeover relay (115) in an electrical supply to the second electric motor (79) driving the recording head (78) whose release contacts are electrically connected to the third and fourth electric motors (113, 114), whereby in the event of a loss of electrical power the holding current to the first electric motor (104) drops to zero and the energy in the spring (109) rotates the gear in an opposite direction to automatically return the loading means to the unloaded position, and the relay (115) drops out so that electrical power generated by the second electric motor (79) driven by the inertia of the recording head (78) is routed directly to the third and fourth electric motors (113, 114) to drive the supply and take up spools (72, 73) of the cassette (25) so as to take up slack tape (74) as the loading means is moved to its unloaded position.

* * * * *